United States Patent [19]

Fling

[11] Patent Number: 4,884,040
[45] Date of Patent: Nov. 28, 1989

[54] SAMPLED DATA PHASE LOCKING SYSTEM

[75] Inventor: Russell T. Fling, Noblesville, Ind.

[73] Assignee: RCA Licensing Corporation, Princeton, N.J.

[21] Appl. No.: 324,875

[22] Filed: Mar. 17, 1989

Related U.S. Application Data

[63] Continuation-in-part of Ser. No. 249,022, Sep. 26, 1988, abandoned.

[51] Int. Cl.$^4$ .......................... H03L 7/08; H03D 13/00
[52] U.S. Cl. .................................... 331/1 A; 307/516; 328/133; 328/155; 331/14; 331/17; 331/27; 358/19; 358/158
[58] Field of Search ..................... 331/1 A, 14, 17, 25, 331/27; 307/510, 511, 516, 514; 328/133, 134, 155; 358/19, 158

[56] References Cited

U.S. PATENT DOCUMENTS

4,491,862  1/1985  Flamm .............................. 358/21 R

Primary Examiner—Siegfried H. Grimm
Attorney, Agent, or Firm—Joseph S. Tripoli; Eric P. Herrmann; James B. Hayes

[57] ABSTRACT

A phase locking system for providing a sampling signal which is to be phase/frequency locked to an applied signal includes a controllable oscillator coupled to a sampling circuit to produce samples of the applied signal representing substantially quadrature phase related components of the applied signal. An accumulator respectively accumulates the quadrature phase components over predetermined intervals. A differencing circuit successively forms the differences of one of the components from successive intervals. The differences are used to generate a control signal to alter the signal generated by the controllable oscillator.

21 Claims, 5 Drawing Sheets

SAMPLED DATA PHASE LOCKING SYSTEM

This is a continuation-in-part of application Ser. No. 249,022, filed on Sep. 26, 1988 and now abandoned.

This invention relates to circuitry for generating a phase locked signal.

BACKGROUND OF THE INVENTION

Digital circuitry is being implemented in increasing numbers of systems which have traditionally been realized with analog circuits for the reasons that (a) digital circuitry is inherently more stable parametrically and (b) advances in digital integrated circuitry are making them cost competitive. Examples of systems that are currently being implemented with digital processing are television systems such as receivers, video cassette recorders, etc., and sound systems such as compact disc players, digital audio tape players, etc. In the above mentioned systems it is frequently necessary to generate clock signals which are phase locked to a component of the signal to be processed. Digital television receivers, for example, are often designed to operate synchronously with the chrominance subcarrier. To facilitate such synchronism the television signal includes a burst of oscillations at the subcarrier frequency, which oscillations are of appropriate phase and occur in a nonactive portion of each video line interval.

A clock signal can be generated which is phase locked to the subcarrier frequency by (a) sampling the burst component to produce substantially quadrature phase related samples of the burst signal; (b) accumulating the respective quadrature samples; and (c) generating a signal for controlling a VCO which develops clock signals that determine the sampling intervals. One such system is disclosed in U.S. Pat. No. 4,491,862 entitled "Color Television Receiver With at Least One Digital Integrated Circuit For Processing the Composite Color Signal," issued to Peter Flamm. The Flamm system includes an analog to digital converter (ADC) which is conditioned by a VCO to sample the video signal at four times the subcarrier frequency. Alternate ones of the samples are quadrature related once the system is phase locked. The samples produced by the ADC are separated into two components corresponding to alternate samples, i.e. an R-Y signal and a B-Y signal both of which are modulated at the subcarrier frequency. Alternate ones of each of the components (the R-Y samples of positive sampling phase and the B-Y samples of positive sampling phase) are accumulated in separate accumulators that are conditioned to operate only on samples taken during burst intervals. The sign (polarity) bits of the accumulated R-Y and B-Y samples are coupled to a switching circuit. The R-Y accumulated samples are applied to a value limiter circuit, and the limited samples coupled to the switching circuit. The sign bits of the accumulated samples indicate whether the phase of the clock signal generated by the VCO is greater or less than + or −90° relative to the phase of the B-Y component. Depending upon the states of the sign bits the switching circuit provides output values equal to a predetermined positive value, a predetermined negative value or the accumulated R-Y values provided by the limiter circuit. The output of the switching circuit is low pass filtered, converted to an analog signal, and applied to the control input of the VCO to form a closed loop phase locked clock generator.

There are at least two shortcomings of the Flamm circuitry. Firstly the phase detection is a function of signal amplitude. The detection accuracy diminishes with smaller signal amplitude. Secondly, since phase detection is amplitude sensitive, the system is subject to phase error if the burst signal contains a DC component. DC components are frequently introduced due to parametric shifts in the ADC or improper biasing of the ADC.

It is an object of the invention to provide a sampled data phase locking system without the foregoing shortcomings.

SUMMARY OF THE INVENTION

The present invention is a sampled data system for generating a signal which is phase locked to a component of an applied signal. A sampling system samples the component at times determined by the generated signal to produce substantially first and second quadrature related component signal samples. An accumulator accumulates the first and second quadrature signals over predetermined intervals. A subtractor circuit forms the difference of the accumulated samples of the first quadrature signal from successive intervals. Means responsive to the difference signal and the polarity of the accumulated second quadrature signal, generates a control signal which is applied to a controlled oscillator. The oscillator, responsive to the control signal, generates the sampling signal phase locked to the applied signal component.

DETAILED DESCRIPTION

The invention will be described in terms of digital, e.g. twos complement binary, hardware, however it will be recognized by those skilled in the art of circuit design that the system may be implemented using sampled data analog components. For example where the digital system uses an ADC for signal sampling, latches for signal storage and adders and subtracters for arithmetic functions, a sampled data analog system may use a sample-and-hold circuit for signal sampling, switched capacitor storage elements for signal storage, and summing and differencing amplifiers for arithmetic functions.

In the illustrated circuitry, additional delay elements may be required to appropriately time align particular clocking signals depending on the designer's choice of circuit elements. These elements have been omitted from the drawing to avoid confusion, however one skilled in the art of circuit design will readily recognize where such delays may be required and be able to incorporate same. In the figures, broad arrows represent multi-bit parallel connectors and line arrows generally represent single conductor connections.

Figure 1:
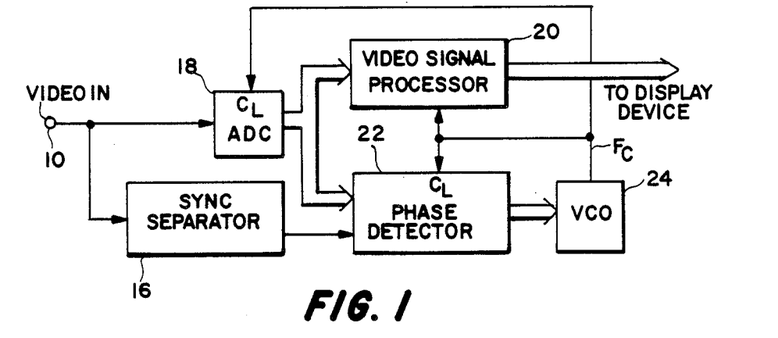
FIG. 1 is a block diagram of a phase locked clock generating circuit as for a television signal processing system.
Figure 3:
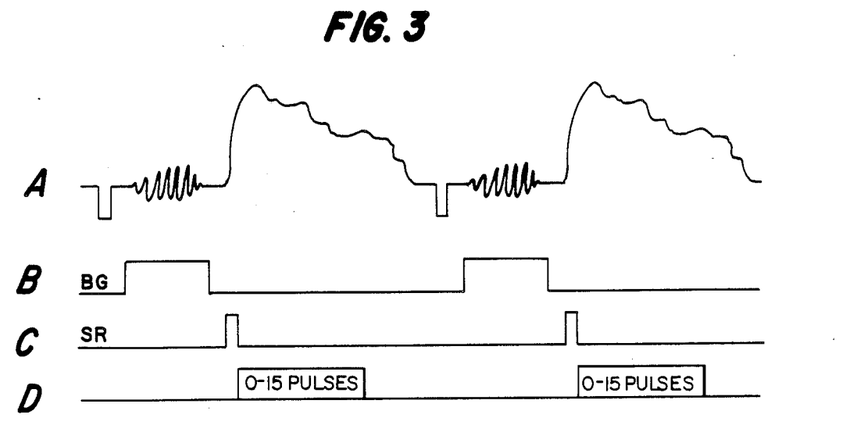
FIG. 3 is a waveform illustration depicting the timing of signals utilized by the FIG. 2 circuitry.

Referring to FIG. 1, a composite analog video signal, illustrated schematically as waveform A in FIG. 3, is applied to terminal 10 from which it is coupled to the ADC 18 and to the sync separater 16. Sync separater 16, which may be of conventional design, derives the horizontal synchronizing component from the composite video signal and applies it to the phase detector circuitry 22. In an alternative arrangement the sync separator may be of digital design and respond to digital composite video signal from ADC 18. The horizontal synchronizing component is use in the phase detector 22 to selectively perform phase detection only during the intervals that the bursts of subcarrier signal occur.

The ADC 18 generates binary representations of the analog composite video signal at instants determined by the sampling clock signal $F_C$. In the description which follows it is presumed that the frequency $f_c$ of the clock signal $F_c$ is four times the frequency of the color subcarrier though this is not a requirement. The binary samples from ADC 18 are coupled to a video signal processor 20 which separates the luminance and chrominance components and derives signals therefrom for application to a display device to reproduce images represented by the video signal. The binary samples from ADC 18 are also coupled to the phase detector 22 which determines the phase of the clocking signal $F_C$ relative to the phase of the burst signal. Phase detector 22 develops a phase/frequency error signal which is coupled to the voltage controlled oscillator (VCO) 24. VCO 24 may be a crystal controlled oscillator which generates a signal that is nominally four times the color subcarrier frequency. VCO 24 includes circuitry which is responsive to a phase error signal for shifting the phase/frequency of the generated clocking signal.

Figure 2:
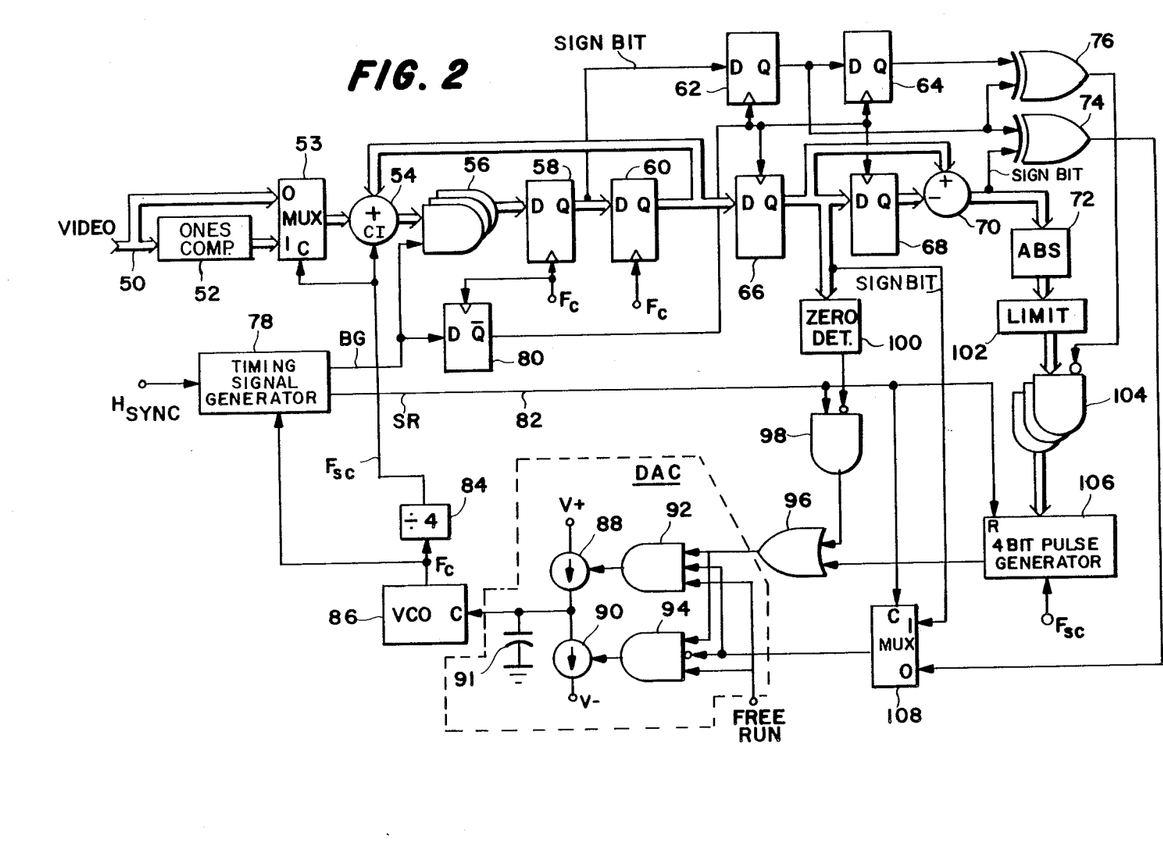
FIG. 2 is a partial schematic/partial block diagram of a phase detector, embodying the present invention, which may be substituted for the phase detector circuit of the FIG. 1 circuit.

Refer to FIG. 2 which illustrates an embodiment of the phase detector 22 of FIG. 1. In FIG. 2, horizontal synchronizing signals from sync separator 16 are coupled to the timing signal generator 78, and digital video samples from ADC 18 are coupled to bus 50. The timing signal generator, responsive to the clocking signal $F_C$ and the horizontal synchronizing signals, generates a burst gate signal BG and a further signal SR. The general timing relationships of the signals BG and SR are illustrated in waveforms B and C of FIG. 3. The burst gate signal nominally provides a pulse encompassing an integral number of cycles of the subcarrier burst component of each active horizontal line of composite video signal. The signal SR provides a pulse occurring after the burst gate pulse on each line interval and has a duration of nominally one subcarrier period. Both the burst gate signal and the signal SR may be generated by conventional counting circuits responsive to the clocking signal $F_C$ and the horizontal synchronizing signals.

The digital video signal on bus 50 is coupled to a ones complement circuit 52 and one input port of a multiplexer 53. The output port of the ones complement circuit is coupled to a second input port of the multiplexer 53. The multiplexer 53 is conditioned by a clock signal of subcarrier frequency to alternately couple two successive samples from bus 50 to its output port and then two successive samples from the ones complement circuit 52 to its output port. The clock signal applied to multiplexer 53 is generated by dividing the clocking signal $F_C$ from the VCO 86, by four in divider 84. The sample stream output by multiplexer 53, during the burst interval, represents a substantially demodulated version of the burst signal at least when the system is phase locked. Alternate samples provided by the multiplexer 53 represent samples of quadrature related signals corresponding to, for example, the R-Y and B-Y or the I and Q video signal components.

The samples provided by multiplexer 53 are coupled to one input port of an adder 54 which is coupled in cascade with one-sample-period storage elements 58 and 60 via the bank of AND gates 56. The output port of storage element 60 is coupled to a second input port of adder 54. The combination of Adder 54 and storage elements 58 and 60 forms a compound accumulator. The accumulator is active when the bank of AND gates is conditioned by the burst gate signal BG to couple the adder 54 to the storage element 58. Alternatively, when the burst gate signal is low, the bank of AND gates provide a zero output signal which effectively zeroes the accumulator. As such the accumulator successively sums samples of the burst signal from single line intervals. During the time that the accumulator is active sums of samples representing the respective quadrature signals are maintained distinct in the two storage elements 58 and 60. At the termination of the burst interval, the R-Y and B-Y accumulated sums are resident in storage elements 60 and 58 respectively (at least when the system has attained phase lock).

It will be noted that the clock signal which controls the multiplexer 53 is coupled to the carry input terminal CI of the adder 54. This effectively causes a unit value to be added to the ones complement samples provided by the multiplexer 53 to transform the ones complemented samples to twos complemented samples. (It is assumed that ADC 18 and the system is designed to process twos complement samples.) It will also be noted that relative to the previously mentioned Flamm system, twice the number of samples are accumulated per burst interval thereby providing twice the loop gain as the Flamm system and in addition provides an improved signal-to-noise ratio.

The sign bit conductor of the output port of the storage element 58 is coupled to the data (D) input of a one bit D-type latch 62. A second one bit D-type latch 64 is coupled in cascade with latch 62. The output port of the storage element 60 is coupled to the data input port of a parallel-bit D-type latch 66. A second parallel-bit D-type latch 68 is coupled in cascade with latch 66. The burst gate signal is coupled to the data input port of a further D-type latch 80 which provides an inverted version of the burst gate signal. The inverted burst gate signal from latch 80 is coupled to the clock input terminals of latches 62, 64, 66 and 68 and conditions latches 62 and 66 to store the respective values from latches 58 and 60 occurring at the termination of the burst interval. The values in latches 62 and 66 are stored for the duration of a line interval and then transferred to latches 66 and 68 respectively. Latches 66 and 68 store the accumulated R-Y samples from two successive video lines and latches 62 and 64 store the sign bits of the accumulated B-Y samples from the corresponding two successive video lines.

The output ports of latches 66 and 68 are coupled respectively to the minuend and subtrahend input ports of a subtractor 70 which produces the difference of the accumulated R-Y values from successive video lines. The subtraction removes any DC component attendant the R-Y samples, thus the difference samples are non sensitive to DC shifts in the composite video signal. The difference values are proportional to $R(SIN\theta1-SIN\theta2)$ where R is equal to the accumulated burst amplitude and $\theta1$ and $\theta2$ correspond to the phase errors of the current and preceding line intervals. This function exhibits greater sensitivity per degree of phase error as the phase error tends toward zero or 180°. The difference values are utilized to frequency lock the generated signal $F_{sc}$ to the burst frequency, that is to cause the rate of change of the phase error to go to zero.

The accumulated values, assuming 8 bit video samples, may be as large as 13 or 14 bit samples. The difference samples can be as large as the accumulated values less one bit. However it is not necessary to define the phase control signal with this precision. Therefore the difference samples are limited to e.g. 4 bits in the limiter 102. The magnitude and polarity of the difference values are used separately in this system. Therefore the difference samples are passed through a magnitude detecting or absolute value circuit 72 to extract the magnitude information: It will be appreciated that magnitude detection may be performed either before or after limiting.

The limited difference samples are gated via a bank of AND gates 104 to the program input port of a programmable pulse generator 106. The limited difference values are loaded into pulse generator 106 in response to the signal SR (waveform C, FIG. 3) from the timing signal generator 78. On termination of the pulse SR, pulse generator 106 produces e.g., zero to fifteen pulses (of period 1/fsc) proportional to the value of the difference value applied to its program input port.

The pulses output from generator 106 are coupled via OR gate 96 to respective first input terminals of AND gates 92 and 94. Depending upon which of the AND gates 92 and 94 is enabled the pulses will be gated to turn on either current source 88 or current sink 90, to respectively charge or discharge capacitor 91 and develop a control voltage for VCO 86.

Figure 4:
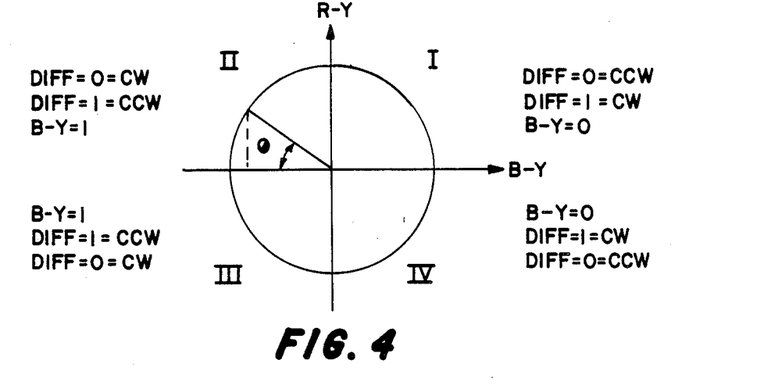
FIG. 4 is a phase diagram useful in describing operation of the invention.

The AND gate 92 or 94 which is enabled to pass the pulses from generator 106 is determined by the polarity of the difference signal and the polarity of the accumulated B-Y samples for the current line interval. Phase and/or frequency lock, may be accomplished by either advancing or retarding the phase of the clocking signal produced by VCO 86. Consider the phase diagram of FIG. 4 and assume that the system is to lock in phase with the −(B-Y) axis. When angle $\theta$ is zero, it is seen from FIG. 4 that the accumulated R-Y value will be zero and the difference value will also be zero. Accumulated values of the B-Y component will be negative in quadrants II and III and positive in quadrants I and IV. Accumulated values of the R-Y component will be positive in quadrants I and II and negative in quadrants III and IV. In FIG. 4 a "1" indicates negative polarity and a "0" indicates positive polarity. If the phase error is changing in a clockwise direction the difference values (DIFF) will be negative, positive, positive and negative in quadrants I,II,III, and IV respectively. In order to achieve frequency lock, the system is conditioned, for large phase errors, to continue moving in the direction indicated by the polarity of the difference signal. This is accomplished by generating the direction signal by exclusive ORing the polarity of the B-Y signal (which indicates whether the phase error is greater than + or −90°) and the polarity indicative bit of the difference signal. It can be seen by calculating the exclusive OR function of the polarities of the accumulated B-Y and DIFF signals indicated in FIG. 4 that the exclusive OR output is the same in quadrants I-IV for clockwise movement. Similarly the exclusive OR output assumes a like state in all quadrants for counter clockwise movement. Thus regardless of which quadrant the system starts, and regardless of the direction of phase change, the system will continue in one direction until the phase error becomes zero.

There exists a potential for error in the direction signal when the phase error crosses the + or −90° points because the difference value may be either positive or negative. This can be appreciated from FIG. 4 by noting that if (for example) the accumulated R-Y values for the current and previous video lines occur in quadrants I and II respectively, and the value for the current line falls on the circle closer to the R-Y axis than the value for the previous line, than the slope of the line joining these value points and thus the sign of the difference value will be positive. Alternatively if the value of the previous line falls on a point of the circle closer to the R-Y axis than the current line, the slope of the line joining these points and thus the polarity of the difference will be negative. These potential errors only occur when the polarity of the accumulated B-Y values change sign between successive lines. This condition is detected by the exclusive OR gate 76 having first and second input terminals coupled respectively to the output terminals of latches 62 and 64. The output of the exclusive OR gate 76 is coupled to the bank of AND gates 104, and disables gates 104 whenever a polarity change in accumulated B-Y values occurs between successive line intervals.

The direction signal is generated by exclusive OR gate 74 which has a first input terminal coupled to latch 62 to sense the polarity of the accumulated B-Y value of the current line interval, and a second input terminal coupled to the sign bit connection of the subtractor 70 output port, to sense the polarity of the difference signal. The output signal from exclusive OR gate 74 is selectively coupled to AND gates 92 and 94 via multiplexer 108. Multiplexer 108 is conditioned by signal SR to couple exclusive OR gate 74 to AND gates 92 and 94 at least during intervals that pulse generator 106 is providing pulses (that is when signal SR is low) and to provide the sign bit or polarity indicating portion of the accumulated R-Y value from latch 66 when signal SR is high.

As previously mentioned, when the system is phase locked the accumulated R-Y values will equal zero. To provide phase lock a zero detector 100 is coupled to the output port of latch 66. The output from the zero detector is coupled to one input terminal of the AND gate 98 and enables AND gate 98 when the accumulated R-Y values are nonzero and disables AND gate 98 only for zero values. The timing signal SR is coupled to a second input terminal of AND gate 98. The pulses of signal SR are coupled to the AND gates 92 and 94 via OR gate 96 when the R-Y values are nonzero. Thus a minimum correction signal of one pulse per line interval is generated as long as the accumulated R-Y values are nonzero regardless of the value of the difference signal applied to pulse generator 106. The duration of the pulse is for example $1/f_{sc}$. The direction of phase correction attendant these unit pulses is determined by the sign or polarity bit of the accumulated R-Y value from latch 66.

In FIG. 2 AND gates 92 and 94 have respective third input terminals to which a signal (FREE RUN) may be applied to disable the AND gates and allow the oscillator to run asynchronously if desired.

In FIG. 2, AND gate 92 is enabled by a logic one valued direction signal from multiplexer 108 and AND gate 94 is disabled. Depending upon the particular VCO 86 implemented it may be necessary to invert or complement the direction signal so that AND gate 92 is disabled and AND gate 94 enabled for a logic one valued direction signal.

In an alternative arrangement the zero detector may be eliminated in which case the signal SR will be coupled directly to OR gate 96. The system will phase lock, however if the value of capacitor 91 is small, there may be a slight phase jitter.

Figure 5:
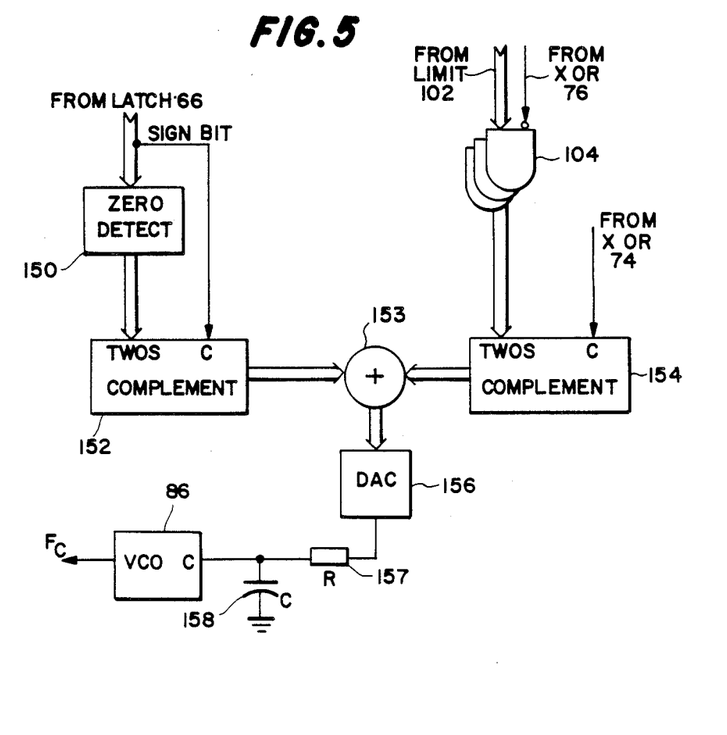
FIG. 5, FIG. 6 and FIG. 7 are partial block diagrams of further embodiments of the invention.

FIG. 5 illustrates a further embodiment of the invention. In FIG. 5 the difference signal is arithmetically combined with signal provided by the zero detector rather than being combined in time division multiplex format. Circuit elements in FIG. 5 which are designated with the same numerals as elements in FIG. 2 are like elements.

In FIG. 5 the limited difference signal from the bank of AND gates 104 is coupled to a twos complementing circuit 154. Twos complementing circuit 154 is controlled by the direction signal generated by the exclusive OR gate 74 to selectively complement the difference values according the desired direction of phase correction. Output values from the twos complement circuit 154 are coupled to one input port of the adder 153.

Accumulated R-Y values from latch 66 are coupled to a zero detector 150. Zero detector 150 provides a zero value whenever the accumulated R-Y value is a zero value. Zero detector 150 provides a predetermined positive value, e.g. 010, in twos complement format whenever the accumulated value is nonzero. The output signal from zero detector 150 is coupled to a twos complementing circuit 152. The sign bit of the accumulated R-Y value is coupled to a control input terminal of the twos complementing circuit 152. Responsive to the polarity indicated by the sign bit, circuit 152 selectively complements the value provided by zero detector 150. Circuits 152 and 154 respectively perform the complementing function responsive to the same polarity of their respective control signals. For consistency with FIG. 2 circuits 152 and 154 complement the applied values when the respective control signals are logic zero valued.

Output values provided by twos complementing circuit 152 are coupled to a second input port of the Adder 153. The sums produced by adder 153 are applied to a digital-to-analog converter (DAC) 156 which develops an analog signal representing the phase error. This analog signal is low pass filtered by resistor 157 and capacitor 158 and thereafter applied to the control input terminal of the VCO 86.

In a still further embodiment the values from the bank of AND gates is coupled directly to adder 153. The output of adder 153 is coupled to the program input of the pulse generator 106. The output of pulse generator 106 is coupled directly to AND gates 92 and 94 and the direction signal from exclusive OR gate 74 is directly coupled to AND gates 92 and 94. In this embodiment AND gate 98, OR gate 96 and multiplexer 108 are eliminated from the FIG. 2 circuitry.

Figure 6:
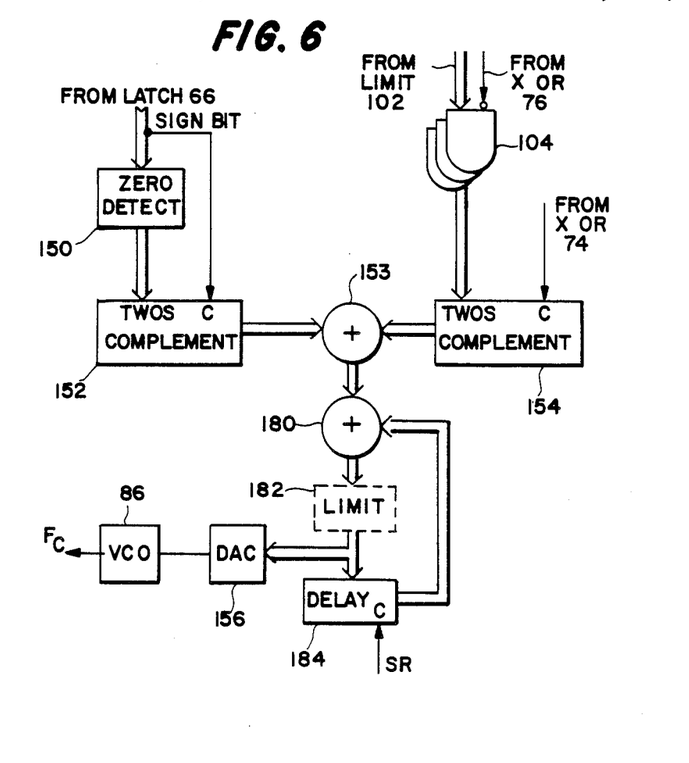

The pull in range of the FIG. 2 system is determined by the control range of the VCO 86. The system, because it uses the differences of accumulated values in the control loop, is unconditionally stable. The capacitor determines the speed of the loop and provides a single FIG. 6 illustrates an all digital version of the FIG. 5 embodiment. In FIG. 6 the RC integrator shown in FIG. 5 is replaced by a digital integrator coupled ahead of the DAC 156. Output sums from adder 153 are coupled to a first input port of the adder 180. The output sums from adder 180 are delayed one line interval in delay element 184 and coupled back to a second input port of adder 180. The input/output transfer function H(z) of the adder-delay circuit is given by:

$$H(z) = 1/(1 - Z^{-1}) \tag{1}$$

where z is the conventional "z" transform variable. The function H(z) will be recognized by those skilled in the art of digital circuit design to correspond to a digital integration or single pole low pass filter function.

It may be desirable to interpose a limiter circuit (182) between the output port of adder 180 and the input port of delay element 184 to preclude the delay element from overflowing. Such a limiter circuit will be designed to limit the maximum and minimum values applied to delay element 184, to values that can be represented by the number of bits delay element 184 is capable of storing.

The output sums from adder 180, or the limited sums from the limiter circuit 182 are coupled to the input port of the DAC 156. DAC 156 converts these sums to an analog control signal for controlling the VCO 86.

Figure 7:
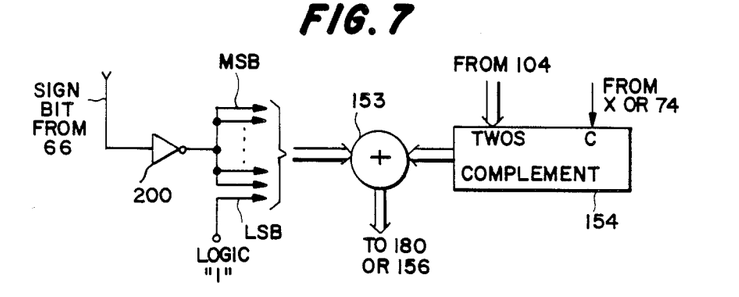

FIG. 7 shows alternate circuitry which may be used with the FIG. 5 and FIG. 6 embodiments. In this instance the zero detector 150 and twos complement circuitry 152 are eliminated. A value of $\pm K$ is coupled to the adder 153 where K may be 1, 2, 3, etc. units, and the polarity is determined by the sign bit of the sum stored in latch 66. In the embodiment shown in FIG. 7, K is selected to be 1. A value of +1 (000··01) is coupled to adder 153 for negative values of the sign bit (logic "1") from latch 66 and a value of −1 (111··11) is coupled to adder 153 for positive values of the sign bit (logic "0"). This forces the system to continuously hunt about the zero phase value. A small amount of phase jitter, dependent on the loop gain and the capacitor value will be incurred. The applied values of ±1 are generated by coupling the LSB of the adder input port to a logic one value and coupling the more significant bits to the output terminal of an inverter 200. The sign bit from latch 66 is coupled to the input terminal of the inverter.

The exemplary embodiments are directed to phase/frequency locking a clock signal to the burst component of a composite video signal. The system will equally well phase/frequency lock to a continuous signal such as the pilot component of a stereo sound signal. In this instance horizontal sync signals may not be available to develop a control signal such as the signal, BG, however a similar control signal can be generated using simple counters.

Figure 8:
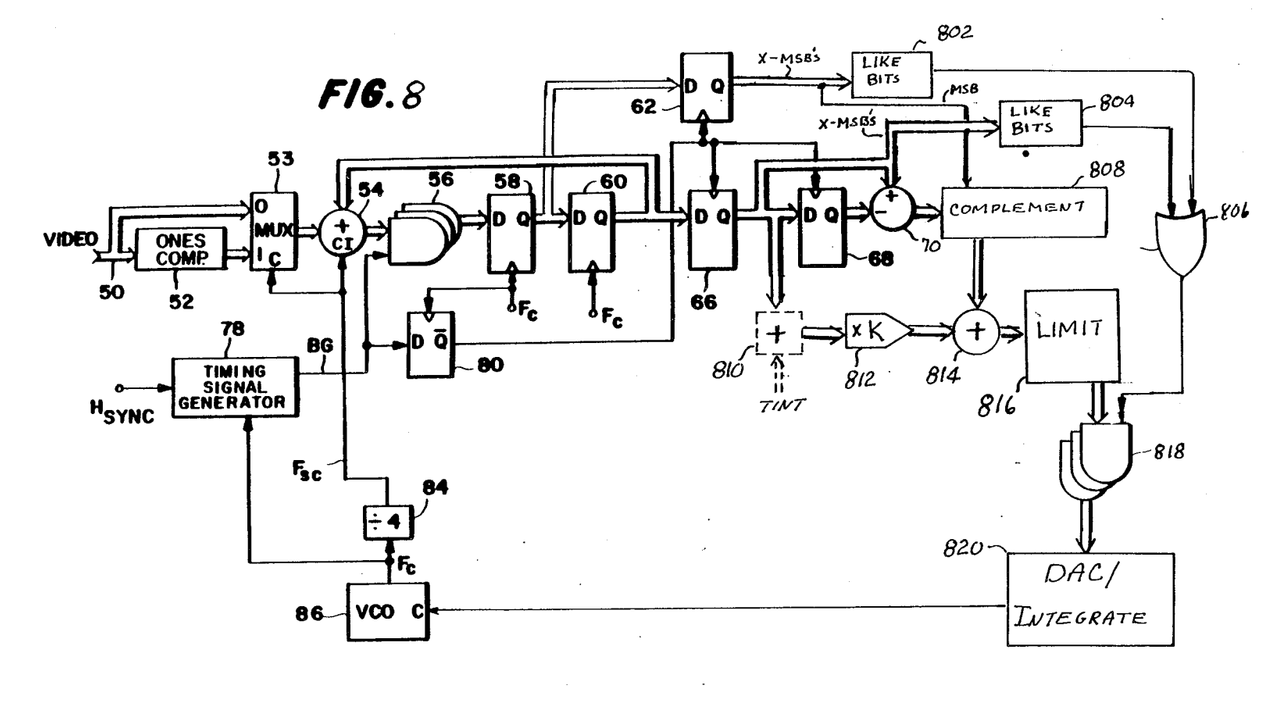
FIG. 8 is a partial schematic/partial block diagram of an alternative phase detection system embodying the invention.

Refer now to FIG. 8 wherein elements designated with like numbers to elements in FIG. 2 are similar and perform like functions. In FIG. 8 the latch 62 stores at least the x more significant bits of the accumulated samples from latch 58. These x more significant bits are coupled to circuitry 802 which provides a logic one output signal only when all of the x more significant bits are in the same state. The x more significant bits of the accumulated sample in latch 66 are coupled to circuitry 804 which provides a logic one output signal only when the x more significant bits from latch 66 exhibit the same state.

The circuitry 802 and 804 may each be realized with two x-input AND circuits. Each of the x-MSB lines is connected to a respective input of one of the two AND circuits. Each of the signals on the X-MSB lines is inverted and coupled to respective input terminals of the other AND circuit. The AND circuits have their respective output terminals coupled to a two-input OR gate, the output terminal of which provides the output signal from the circuitry.

Output signals from circuits 802 and 804 are coupled to respective input terminals of a NAND circuit 806 which provides a logic one output signal when either circuitry 802 or circuitry 804 provides a logic zero output signal, and provides a logic zero signal when circuitry 802 and 804 concurrently provide logic one signals. In this configuration NAND circuit 806 provides a logic one signal whenever the accumulated samples have an amplitude in excess of a value that can be represented by the remaining N-X lesser significant bits of the accumulated samples (where N is the total number of bits representing the respective accumulated samples). The signal from NAND circuit 806 is used to disable the loop whenever the input signal is too small to reliably control the oscillator 86.

The difference samples from subtracter 70 which are related to the rate of change of frequency are coupled to a signal inverting or complementing circuit 808. The samples applied to the subtracter 70 are related to the relative phase angle of burst with respect to the sampling instants, and may be represented by phasors. If for example, these two phasors are both rotating clockwise at a constant rate and are separated by, e.g., five degrees, the polarity of the sample differences will change in different quadrants. Further, the loop time constant is not sufficiently fast that the system is likely to lock in a particular quadrant. Thus the system may alternately provide correction signals of opposite polarities, for differences which are constant or changing in a same direction, tending to prolong the time needed to phase-/frequency lock. To prevent such occurrence the sample differences are complemented during intervals that the phasor difference (moving in a particular direction) will change sign. This is accomplished by coupling the sign bit of the accumulated sample in latch 62 to control the complementing circuit. Consider that latches 62 and 66 hold (B-Y) and (R-Y) accumulated samples respectively. Whenever the (B-Y) accumulated samples are negative (quadrants II and III of FIG. 4), the sample differences are complemented.

Output samples from the complementing circuit 808 are coupled to a first input port of an adder 814. Samples from the latch 66 which are scaled by a factor K in circuit element 812 are coupled to a second input port of the adder 814. The scale factor may be equal to ⅛ or smaller depending on the desired loop locking interval. The scaled samples represent the phase error signal. The complemented signals from circuit 808 are added to the phase error signal to damp the phase error signal. Since the signals from circuit 808 are difference samples, they nominally tend to be small valued relative to the samples from latch 66. The phase error samples are reduced in magnitude by scaling in order that the complemented samples will have a significant damping effect.

In an alternative embodiment the fractional scaling circuit 812 is eliminated from the sample path between the latch 66 and the adder 814. In lieu of this fractional scaling circuit, a scaling circuit, which scale samples by, e.g., the reciprocal of the scale factor K of Circuit 812, may be interposed between the subtractor 70 and the complementing circuit 808. This latter arrangement provides a phase control signal of greater accuracy and amplitude as the system approaches the locked condition.

Samples output from the adder 814 are applied to a limiter 816 which may limit the signal excursion from, e.g., +15 to −16. Signal from the limiter 816 is coupled to a gating circuit 818 which is controlled by the signal generated by the NAND circuit 806. The gating circuit 818 is conditioned to pass signal from the limiter as long as the input signal is greater than a predetermined minimum value.

Output signal from the gating circuit is coupled to integrating and digital-to-analog converting circuitry 820 which may take the form of DAC's and integrators as shown in FIG. 5 or 6. Output signal from circuitry 820 is coupled to control the oscillator 86.

As described the FIG. 8 circuitry will lock the generated signal Fc to one of the quadrature components of the sampled signal (R-Y or B-Y, for example). If it is desired to phase lock the signal Fc off these axes, a phase adjustment signal may be added to the phase error signal. This is accomplished in the adder 810 interposed between the latch 66 and the scaling circuitry 812. In adder 810 a tint or phase control signal is added to the samples from the latch 66. Note that adder 810 may alternatively be included between scaling circuitry 812 and adder 814.

In a further embodiment, if the overall system includes an ACC circuit, the ACC signal may be implemented to enable the gating circuit 818 rather than the signal generated by the circuitry 802, 804 and 806.

I claim:
1. A system for generating a signal FC having a predetermined relationship with an applied signal FS, said system comprising:
   a signal input terminal for receiving said signal FS;
   sampling means coupled to said signal input terminal and responsive to said generated signal, FC, for generating samples of first and second substantially quadrature phase components of said signal FS, said samples including magnitude and polarity information;
   accumulating means, coupled to said sampling means, for forming first and second sums of samples representing said first and second quadrature phase components respectively over fixed time intervals;
   storage means, coupled to said accumulating means, for storing said first sums from two successive intervals and for storing at least the polarity information of said second sums from at least one interval;
   difference means, coupled to said storage means, for successively generating arithmetic differences of said first sums from said two successive intervals;
   conversion means, coupled to said difference means, and responsive to the magnitude and polarity information of said arithmetic differences, for generating an analog signal; and
   a controlled oscillator coupled, to said conversion means, and responsive to said control signal, for generating said signal, FC.

2. The system set forth in claim 1 wherein alternate ones of said samples represent said first and second quadrature phase components respectively and said accumulating means comprises:

signal combining means having a first input port coupled to said sampling means, having a second input port and an output port;

gating means having an input port coupled to the output port of said signal combining means, having a control input terminal and an output terminal;

a clocked latch coupled between the output port of the gating means and the second input port of said signal combining means; and     timing signal generating means for providing a signal to clock said clocked latch and for generating a signal for application to said control input of said gating means to determine intervals over which the signal samples are to be accumulated.

3. The system set forth in claim 1 wherein said sampling means comprises:

an analog-to-digital converter having an input terminal coupled to said signal input terminal, having an output port, and having a sampling clock input terminal coupled to said controlled oscillator, for generating digital samples at a rate $F_C$;

means coupled to the output port of said analog-to-digital converter for providing a sequence of samples from said analog to digital converter wherein alternate pairs of said sequence are complemented.

4. The system set forth in claim 1 wherein said conversion means comprises:

a magnitude detector for providing the magnitude information of an applied signal;

a limiter, for providing at an output terminal thereof, the value of an applied sample if within a predetermined range of values, or the value of the maximum or minimum of said range if said applied sample is greater or lesser than said maximum or minimum respectively;

a programmable pulse generator having a program input port, and having an output terminal for providing a pulsed signal related to values applied to said program input port;

means for serially coupling said magnitude detector and said limiter between the difference means and the program input port of said programmable pulse generator;

logic means, coupled to said storage means and said difference means, and responsive to the polarity information of said second sums and said differences for generating a phase direction correction signal; and     variable signal generating means coupled to said programmable pulse generator and said logic means for providing a signal having a magnitude responsive to said pulsed signal and a direction of magnitude change responsive to said phase direction correction signal.

5. The system set forth in claim 4 wherein said conversion means further includes:

a zero detector coupled to said storage means and responsive to the lastmost accumulated first sum, for providing a signal having first and second states for said first sum being zero and nonzero valued respectively;

further combining means coupled between the output terminal of said programmable pulse generator and said variable signal generating means for combining said signal from said zero detector with said signal from said pulse generator.

6. The system set forth in claim 5 wherein said conversion means further includes means coupled to said storage means and responsive to a difference in polarity information between successive second sums for rendering said programmable pulse generator to be nonresponsive to said differences.

7. The system set forth in claim 4 wherein said logic means comprises an exclusive OR gate.

8. The system set forth in claim 1 wherein said conversion means comprises:

a zero detector coupled to said storage means for providing a signal having first and second states for said first sums being zero and nonzero valued respectively;

means, including combining means, coupled to said difference means and said zero detector for providing a combined signal representing said differences and said signal from said zero detector; and     means, coupled to said means including combining means, for producing changes in said analog control signal proportional to said combined signal.

9. The system set forth in claim 8 wherein the means including combining means, includes:

first pulse generating means coupled to said difference means for providing a burst of pulses per said interval, which burst of pulses conveys information representing said differences;

second pulse generating means coupled to said zero detector for providing a pulsed signal for nonzero first sums; and     said combining means comprises a logic OR function circuit having first and second input terminals coupled to said first and second pulse generating means.

10. A phase detection system, for generating a signal indicating a phase error between a sampling signal and an analog signal, comprising:

sampling means responsive to said sampling signal for providing samples representing the amplitude of said analog signal at instances corresponding to a predetermined phase of said sampling signal, alternate ones of said samples representing first and second substantially quadrature phase components of said analog signal, said samples including magnitude and polarity information;

accumulating means, coupled to said sampling means, for forming first and second sums of samples over predetermined intervals, said first and second sums representing said first and second quadrature phase components respectively;

storage means, coupled to said accumulating means for successively storing first sums from two successive ones of said predetermined intervals and at least polarity information of second sums from at least one of said intervals;

subtraction means, coupled to said storage means, for successively generating arithmetic differences of said first sums from two successive intervals;

zero detection means, coupled to said storage for providing a signal exhibiting a first state for said first sums being equal to a zero value and at least a second state for said first sums being nonzero; and     means, including combining means, coupled to said subtraction means and said zero detection means for providing a combined signal representing said differences and said signal provided by said zero detection means, said combined signal representing said signal indicating a phase error.

11. The system set forth in claim 10 wherein the means including combining means further includes logic means coupled to the storage means and the subtraction means for providing a phase direction correction signal having a first and second state when the differences and said second sums exhibit like and different polarities respectively, said phase direction correcting signal comprising a component of said signal indicating a phase error.

12. The system set forth in claim 10 wherein the means including combining means comprises:
an absolute value circuit;
a limiter;
a pulse generator, having a program input port, for providing a burst of pulses for each said predetermined interval, said burst of pulses conveying information representing values applied to said program input port;
means for coupling said absolute value circuit and said limiter in cascade between said subtraction means and the program input port of said pulse generator;
means, having an input port coupled to said zero detection means, for providing a signal of predetermined duration for ones of said predetermined intervals; and
wherein said combining means comprises a logic gate circuit having first and second input ports coupled to said pulse generator and said means for providing a signal of predetermined duration.

13. A method of locking a generated signal from a controllable signal generator to an applied signal, comprising:
sampling the applied signal at a particular phase of said generated signal to produce samples representing first and second quadrature phase related components of said applied signal;
accumulating said samples over predetermined intervals to produce first and second sample sums representing said first and second components;
forming differences of said first sample sums from successive intervals;
generating a zero detection signal having a first state for said first sample sums being zero valued and at least a second state for said first sample sums being nonzero; and
combining signals representing said differences and said zero detection signal to develop a signal for controlling said controllable signal generator.

14. A method of locking a generated signal from a controllable signal generator to an applied signal comprising:
sampling the applied signal at a particular phase of said generated signal to produce samples representing first and second quadrature phase related components of said applied signal;
accumulating said samples over predetermined intervals to produce first and second sample sums representing said first and second components;
forming differences of said first sample sums from successive intervals;
generating a direction signal responsive to the polarities of said second sample sums and said differences; and
developing a control signal for controlling said controllable signal generator, said control signal having a magnitude proportional to said differences and a polarity determined by said direction signal.

15. A detection system for generating an output signal representing a phase relationship between a sampling signal and a video signal including a subcarrier component, said detection system comprising:
sampling means responsive to said sampling signal for providing samples representing the amplitude of said video signal at instants corresponding to a predetermined phase of said sampling signal to produce samples representing first and second substantially quadrature phase components of said subcarrier component, said samples including magnitude and polarity information;
accumulating means, coupled to said sampling means, for respectively accumulating samples of said first and second quadrature phase components over predetermined intervals;
subtracting means, coupled to said accumulating means for successively generating difference samples representing the difference of accumulated samples of said first quadrature phase component from successive ones of said predetermined intervals;
means for providing said output signal including means responsive to the polarity information of the accumulated sample of said second quadrature phase component, for selectively complementing said difference samples.

16. The detection system set forth in claim 15 wherein said means for providing said output signal further includes integrating means coupled to said means for selectively complementing said difference samples for integrating samples provided by said complementing means.

17. The detection system set forth in claim 16 wherein said means for providing said output signal further includes limiter means coupled between said complementing means and said integrating means for limiting the maximum and minimum sample values that are coupled to said integrating means.

18. The detection system set forth in claim 17 wherein said means for providing said output signal further includes means coupled between said complementing means and said limiter means for combining, in a predetermined ratio, samples from said subtracting means with samples representing accumulated values of said first quadrature phase component.

19. The detection means set forth in claim 16 wherein said means for providing said output signal further includes:
gating means coupled between said complementing means and said integrating means and responsive to a predetermined state of a control signal for passing samples from said complementing means to said integrating means; and
means coupled to said accumulating means for determining the relative amplitude of said subcarrier component, and generating said control signal in said predetermined state only when said amplitude exceeds a predetermined value.

20. The detection system set forth in claim 15 wherein said means for providing said output signal further includes means coupled to said accumulating means and said means for complementing, for combining in a predetermined ratio, signal from said subtracting means and signal representing accumulated values of said first quadrature phase component from one of said two successive intervals.

21. The detection system set forth in claim 20 wherein said means for providing said output signal further includes integrating means coupled to said means for combining, for integrating combined signal to generate said output signal.

* * * * *